No. 862,731. PATENTED AUG. 6, 1907.
A. D. GURNEY & B. B. WATERMAN.
MACHINE FOR MAKING SHOE SHANKS.
APPLICATION FILED JUNE 23, 1906.

WITNESSES
INVENTORS

No. 862,731.

PATENTED AUG. 6, 1907.

A. D. GURNEY & B. B. WATERMAN.
MACHINE FOR MAKING SHOE SHANKS.
APPLICATION FILED JUNE 23, 1906.

WITNESSES

INVENTORS

FIG. 3.

No. 862,731. PATENTED AUG. 6, 1907.
A. D. GURNEY & B. B. WATERMAN.
MACHINE FOR MAKING SHOE SHANKS.
APPLICATION FILED JUNE 23, 1906.

No. 862,731. PATENTED AUG. 6, 1907.
A. D. GURNEY & B. B. WATERMAN.
MACHINE FOR MAKING SHOE SHANKS.
APPLICATION FILED JUNE 23, 1906.

WITNESSES
A. T. Palmer
May A. Kenney

INVENTORS
Alton D. Gurney
Bradford B. Waterman
By their Attorney
Hart Anderson

No. 862,731. PATENTED AUG. 6, 1907.
A. D. GURNEY & B. B. WATERMAN.
MACHINE FOR MAKING SHOE SHANKS.
APPLICATION FILED JUNE 23, 1906.

UNITED STATES PATENT OFFICE.

ALLSTON D. GURNEY, OF WHITMAN, AND BRADFORD B. WATERMAN, OF EAST BRIDGEWATER, MASSACHUSETTS; SAID WATERMAN ASSIGNOR TO SAID GURNEY.

MACHINE FOR MAKING SHOE-SHANKS.

No. 862,731.    Specification of Letters Patent.    Patented Aug. 6, 1907.

Application filed June 23, 1906. Serial No. 323,018.

*To all whom it may concern:*

Be it known that we, ALLSTON D. GURNEY and BRADFORD B. WATERMAN, citizens of the United States, residing at Whitman and East Bridgewater, respectively, in the county of Plymouth and State of Massachusetts, have invented certain new and useful Improvements in Machines for Making Shoe-Shanks; and we do hereby declare the following to be a full, clear, and exact description of the invention, such as will enable others skilled in the art to which it appertains to make and use the same.

The present invention relates to machines for manufacturing shank pieces for boots or shoes and more particularly to machines for cutting out of fibrous sheet material the shank blanks and molding these blanks to the desired shape.

As is well known to those skilled in this art, boot and shoe shanks are generally made of a body portion formed from some suitable fibrous material, generally leather or leather board. This body portion approximates in general outline the shank or waist portion of the shoe and its opposite side edges are beveled previous to the molding operation, which molding operation imparts to the blank or body portion such a shape that the completed blank will have a substantially flat surface upon one of its sides and a substantially curved surface upon its other side. In completing the shank this fibrous body portion has generally secured to its flat side or face a narrow strip of steel which reinforces the body portion and imparts thereto the necessary stiffness and spring desired in the shank of the boot or shoe.

The present invention has for its object the production of a machine for the manufacture of the fibrous body portions of shoe shanks and to produce a machine of simple form and arrangement so constructed and arranged as to expeditiously cut from a strip of fibrous material the blanks and to mold the blanks to the desired shape.

To the above ends the present invention consists of the devices and combinations of devices which will be hereinafter described and claimed.

The present invention is illustrated in the accompanying drawings in which:—

Similar reference characters will be used throughout the specification and drawings to designate corresponding parts.

The machine of the drawings comprises a suitable frame consisting of the side standards 1, united at their lower ends by the cross rods 2 and at their upper ends by a head or bed plate 3, secured to the standards 1 in any suitable or convenient manner, as by the bolts 4.

Mounted in suitable bearings 5 in the standards 1 is the main shaft 6, carrying fast and loose pulleys 7 and 8, arranged to be driven by a belt from any suitable source of power.

In the machine of the drawings there are provided three cutter heads, one located at the center at one side of the machine and carrying a pair of knives for cutting from the end of a strip of fibrous material two blanks, and the other cutter heads each carrying a single knife and located at the opposite side of the machine and at opposite sides of the central cutter head, which knives operate upon the respective blanks, and upon the sides of the respective blanks opposite to the sides which have been previously acted upon by the knives of the central cutter head. The central cutter head 9 is carried by the upper end of a rocking lever 10, which lever 10 is pivotally mounted upon a shaft 11 supported in bearings or boxes 12 fastened to one side of the standards 1. At its lower end the rocking lever 11 is pivotally connected at 13 to a link 14 carrying an eccentric strap 15, which engages an eccentric 16 carried by the counter shaft 17. The counter shaft 17 is driven from the main shaft 6 through the pinion 18 fixed to the left hand end of the shaft 6, which pinion drives the gear 19 fastened to the counter shaft 17.

Upon the opposite side of the machine there are two similar levers 20 and 21, each of which carries cutter heads 22 and 23, and like the lever 10, the levers 20 and 21 are fulcrumed upon a shaft 24, supported in bearings or boxes 25 carried by the side standards 1.

At their lower ends the levers 20 and 21 are pivotally connected at 26 and 27 to links 28 and 29 which carry eccentric straps 30 and 31, engaging respectively the eccentrics 32 and 33 mounted upon the counter shaft 17. It will be observed that the eccentrics 32 and 33 are in the same angular position upon the shaft 17, but that the eccentric 16 is in an angular position upon the shaft 17 exactly the reverse of the angular position of the eccentrics 32 and 33, and that therefore the rotation of the counter shaft 17 will through the respective eccentrics and their connections with the levers 10, 20 and 21, impart a rocking movement to these levers about their fulcrums and that the arrangement is such that the lever 10 will be operated in alternate time relation with the levers 20 and 21, which latter levers operate simultaneously.

Figure 1:
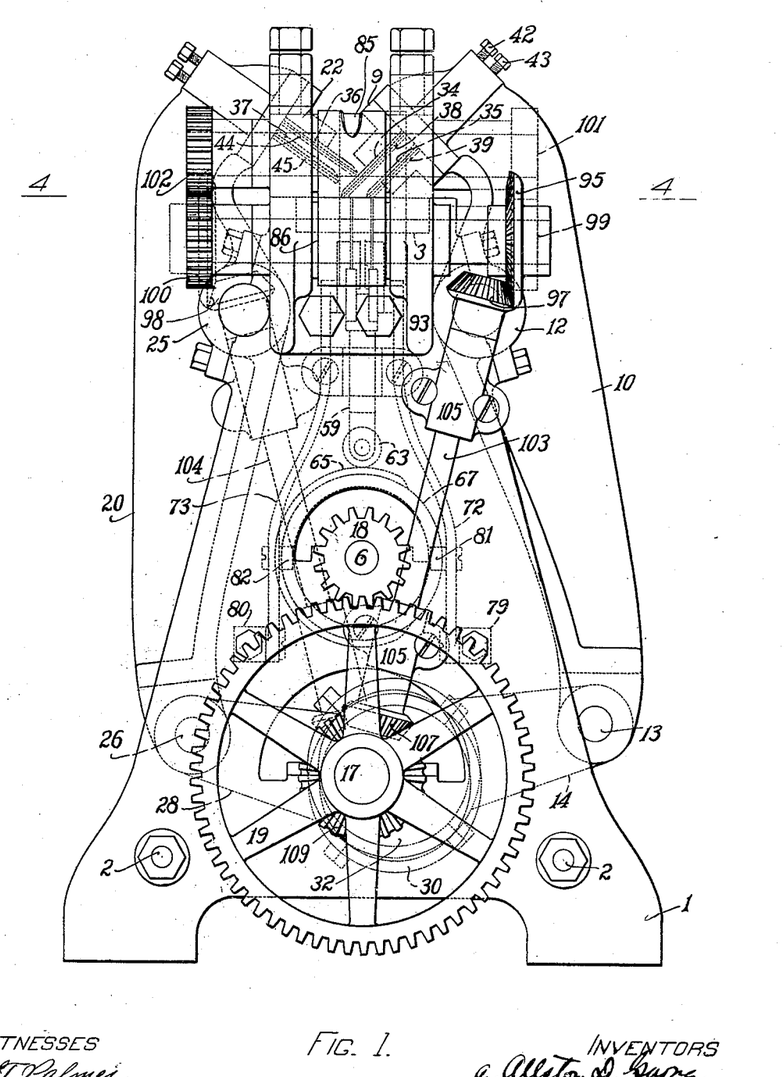
Figure 1 shows the machine in side elevation.
Figure 3:
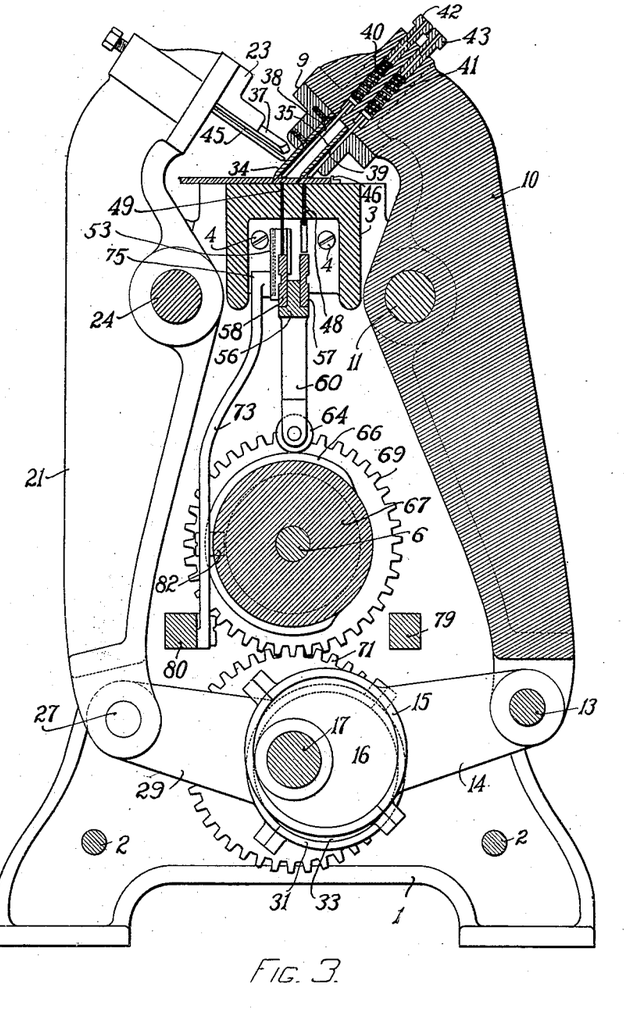
Fig. 3 shows a vertical sectional view taken on the line 3—3, Fig. 2, looking towards the right in said figure.

The cutter head 9 of the lever 10 is provided with two cutters, 34 and 35, which are secured thereto in any suitable or convenient manner, and as shown in Figs. 1 and 3 of the drawings, these cutters 34 and 35 bear such an angular relation to the upper end of the lever 10 that when said lever 10 is rocked they approach and operate upon the material at an angle of 45 degrees.

Figure 2:
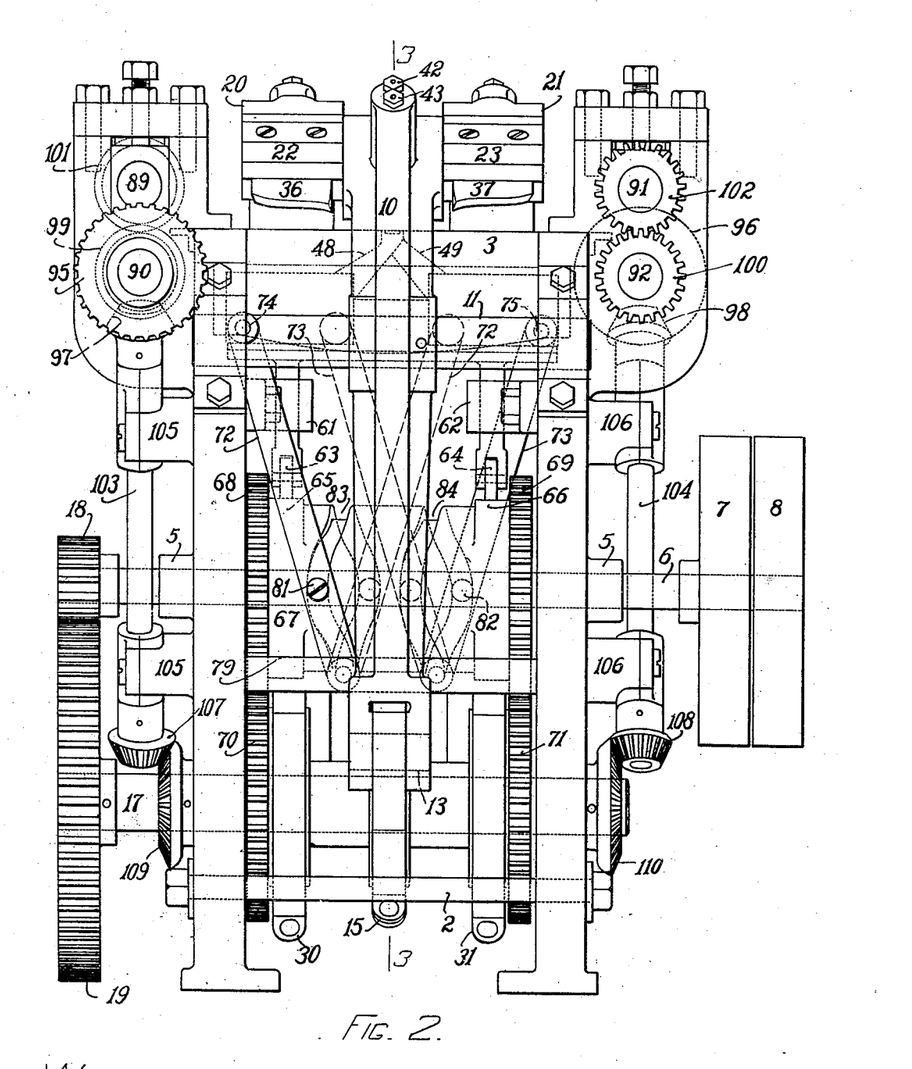
Fig. 2 shows the machine in rear elevation.

Each of the cutter heads 22 and 23 carries a single cutter 36 and 37 respectively (see Figs. 1, 2 and 3), and like the cutter head 9 these cutters also bear such angular relation to the upper ends of the respective levers 20 and 21 that they also approach the material to be cut at an angle of substantially 45 degrees.

Figures 10, 11, 12:
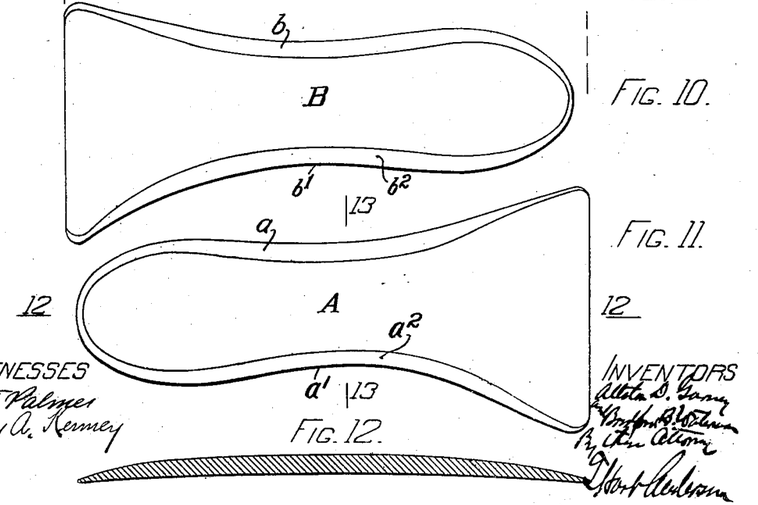
Figs. 10 and 11 illustrate the blanks after leaving the cutters.
Fig. 12 illustrates a longitudinal sectional view of the blanks taken on the line 12—12, Fig. 11.

The cutters 34 and 35 in their operation upon the strip of fibrous material from which the blanks are formed cut therefrom at a single operation two blanks reversely arranged as shown in Figs. 10 and 11, each of these cutters in their operation upon the material beveling one side of the severed blanks; that is to say, looking at Figs. 10 and 11, the operation of the cutters 34 and 35 will operate upon the edge $a$ of the blank A, and the edge $b$ of the blank B, the cut $b$ separating the two blanks from the strip of material and the cut $a$ separating the two blanks from each other, as shown in Figs. 10 and 11. It will of course be understood that these cutters 34 and 35 have an outline (which cannot be conveniently illustrated in the drawing) of substantially the compound curve shown by the cuts $a$ and $b$, as shown in Figs. 10 and 11. It is apparent that the operation of these cutters 34 and 35 will leave the meeting edge of the blank B, which was severed from the blank A by a cut which produces the bevel $a$ on the blank A, with a corresponding under-cut bevel, and that the operation of the cutter 34, which severed the blank B from the strip of material, in which operation it forms the beveled cut $b$, will likewise leave an under-cut bevel at the end of the strip of material. Therefore, assuming that the blanks A and B have only been operated upon by the cutters 34 and 35, the opposite edges of the blanks will have undercut bevels. In order to produce the blanks as shown in Figs. 10 and 11, after they are operated upon by the cutters 34 and 35, they are simultaneously operated upon and respectively by the cutters 36 and 37, one of these cutters operating on the blank B along the edge $b'$ to produce the bevel $b^2$, and the other of these cutters operating upon the blank A along the edge $a'$ to produce the bevel $a^2$.

Thus the operation of the cutters will produce two blanks like those illustrated in Figs. 10 and 11.

The cutter head 9 is provided with presser feet 38 and 39 mounted in suitable bearings in the upper end of the lever 10, and held downward by springs 40 and 41 and the adjusting screws 42 and 43. Like the usual operation of similar presser feet the presser feet 38 and 39 are held by the springs 40 and 41 normally with their lower ends slightly in advance of the edges of the cutters, so that they will contact with and exert pressure upon the material while being operated upon by the cutters. Similarly the cutter heads 22 and 23 are provided with presser feet 44 and 45 which are mounted in the cutter heads and held down by the springs and adjusting nuts in the same manner. It will be understood that these presser feet engage the blanks and hold them just prior to the operation of the cutters thereon.

Figure 4:
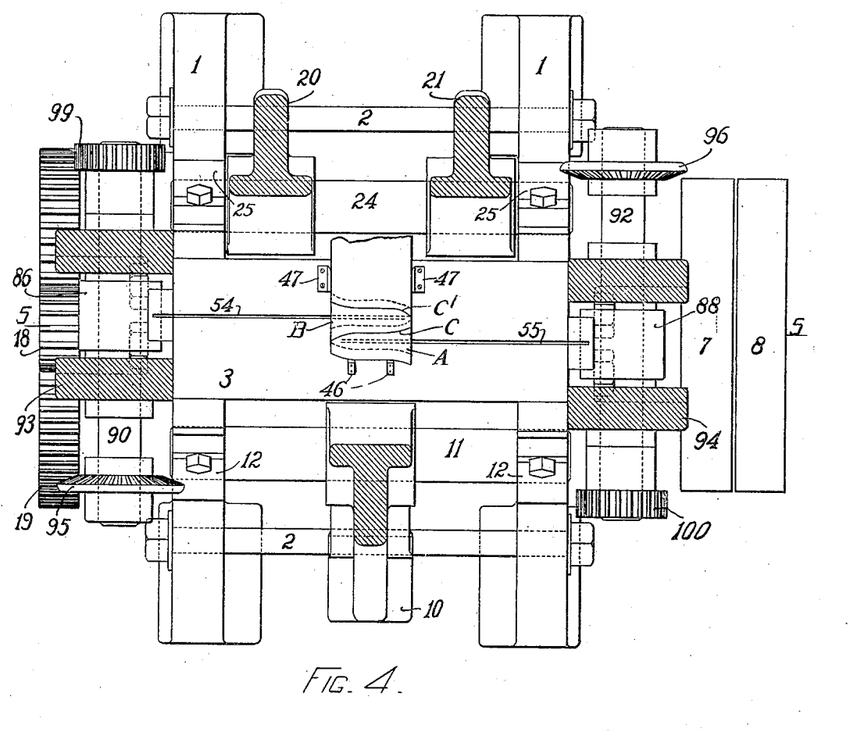
Fig. 4 represents a cross section of the machine taken on the line 4—4, of Fig. 1, and looking from the top downward.

The material from which the blanks are cut is fed into the machine between the levers of the two cutter heads 22 and 23 as shown in Fig. 4 of the drawing, and rests upon the upper surface of the bed or table 3. To properly position the forward end of the strip of material so as to be operated upon by the cutters 34 and 35, there are provided suitable end gages 46 (see Figs. 3 and 4), against which the forward end of the material is adapted to bear. These gages 46 are secured to the upper surface of the table 3 and there are also provided side gages 47 likewise secured to the upper surface of the table 3 for positioning the strip of material.

As shown in Fig. 4, the strip of material is in position to be operated upon by the double cutters 34 and 35 of the cutter head 9, and as indicated, the cutters 34 and 35 have completed their operation and have cut from the end of the strip of material two blanks, making the beveled cut $c$ and the beveled cut $c'$. This operation as will be observed produces two blanks, the opposite edges of which are beveled in the same direction; that is to say, one edge will be beveled on its upper surface and the other edge on its under surface. After the operation of the cutters 34 and 35 the blanks will be moved laterally in opposite directions and brought under the cutters 36 and 37 respectively, the blank A being moved towards the right as shown in Fig. 4, and the blank B towards the left.

Figure 5:
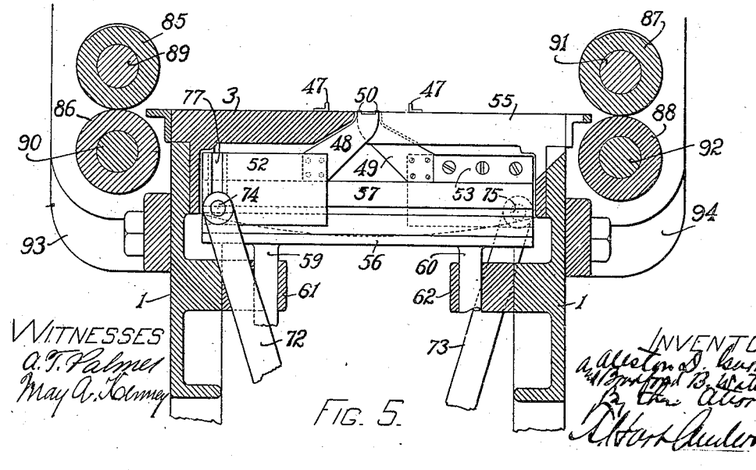
Fig. 5 shows a cross section taken on the line 5—5, Fig. 4, with the driving pulleys omitted and showing the blank transferrers in the position which they will occupy at the beginning of the operation of the machine.
Figure 6:
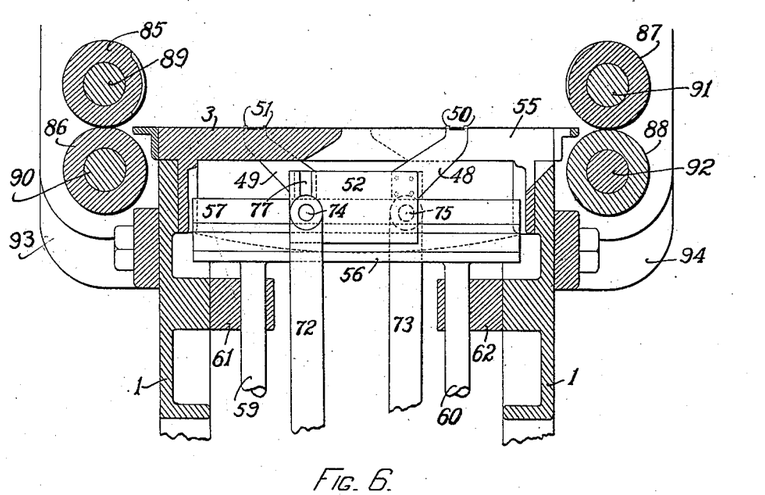
Fig. 6 shows a view similar to Fig. 5, with the transferrers in the position which they will occupy at a second stage in the operation of the machine.
Figure 7:
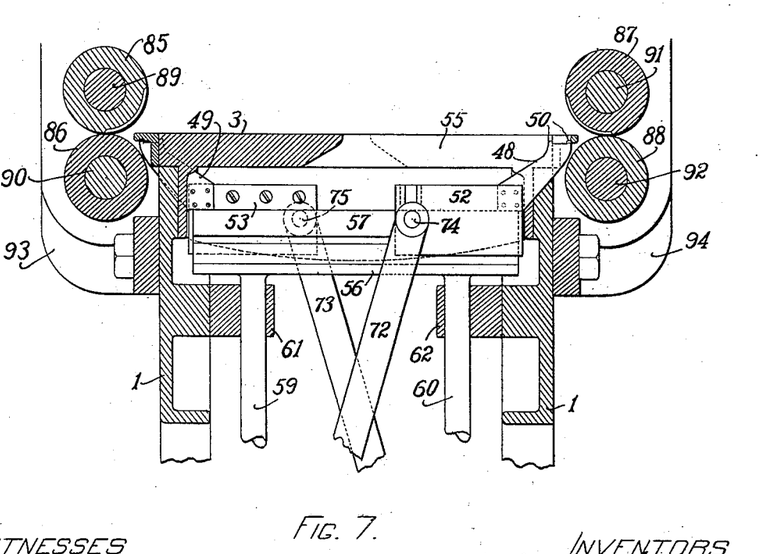
Fig. 7 shows a view similar to Fig. 5 and Fig. 6, with the blank transferrers in their extreme outward position after delivering the blanks to the shaping rolls and just previous to their return to the starting position.
Figures 8, 9, 13, 14:
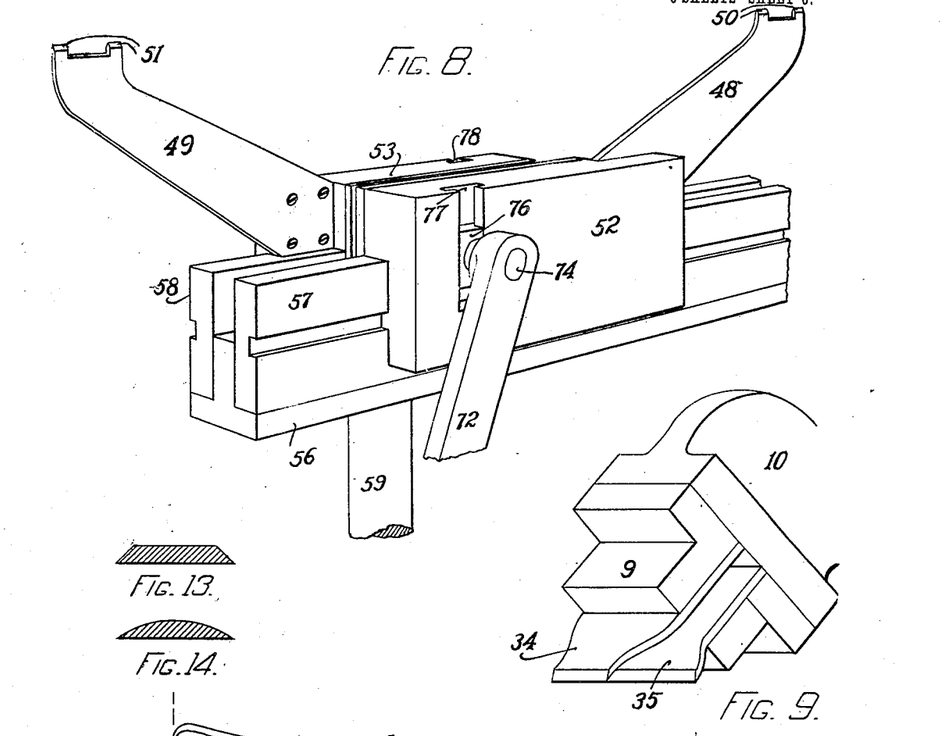
Fig. 8 shows in perspective on a somewhat enlarged scale the blank transferrers.
Fig. 9 shows a perspective view of the cross head carrying the double cutters.
Fig. 13 represents a transverse section taken on the line 13—13, of Fig. 11, representing the shape of the blank after leaving the cutters.
Fig. 14 represents a similar view of the blank after leaving the forming and shaping rollers.

For the purpose of moving the blanks I have provided the transfer mechanism shown clearly in Figs. 5, 6, and 7, and in perspective in Fig. 8. This transfer mechanism consists of the upwardly extending arms 48 and 49 carrying the sharpened points 50 and 51. These arms 48 and 49 are mounted upon carriers 52 and 53, and project upward through slots 54 and 55 in the table 3.

As clearly shown in Fig. 4, the slots 54 and 55 extend in opposite directions from the center of the bed or table 3 towards and through each end thereof, and are spaced apart and parallel to each other and overlapping at their inner ends.

From Fig. 4 it will be observed that when the cutters 34 and 35 sever the blanks A and B from the end of the strip of material, the blank A will be over the slot 55 at its inner end and the blank B will be over the slot 54 at its inner end. It will also be observed that the arms 48 and 49 are movable laterally in the slots 54 and 55 and in Fig. 5 is shown the position which these arms 48 and 49 will have at the time the cutters 34 and 35 are operating; that is to say, their meeting ends will overlap each other, so that the points 50 and 51 of these arms 48 and 49 may be raised vertically above the upper surface of the bed or table 3 and engage the under surface of the blanks A and B. For the purpose of providing the up and down movement of the arms 48 and 49 and their points 50 and 51 the carriers 52 and 53 are mounted upon the cross head 56 (see Figs. 5, 6, 7 and 8), which cross head is provided with the grooved guides 57 and 58, upon which the carriers 52 and 53 rest and along which they are adapted to slide. (See Fig. 8.) This cross head 56 is provided with the downwardly extending rods 59 and 60 arranged to have a vertical reciprocation in suitable bearings 61 and 62 (see Figs. 5, 6 and 7; also Fig. 2). At their lower ends these rods 59 and 60 are provided with cam rolls 63 and 64 (see Fig. 2), which rest upon the peripheral cams 65 and 66 mounted upon the shaft 6. The cams 65 and 66 form a part of a cam cylinder 67 which turns loosely upon the shaft 6, and which is provided at its opposite ends with the gears 68 and 69, meshing with the gears 70 and 71, fixed to the counter shaft 17. Thus the cam cylinder 67 will be driven through the shaft 17 and not directly by the shaft 6.

From the foregoing description it will be observed that a rotation of the cam cylinder 67 will, through the cam rolls 63 and 64 and the rods 59 and 60, raise the cross head 56 and its guides 57 and 58, thus raising the carriers 52 and 53 to force the points 50 and 51 into the under surface of the blanks and this operation will take place once during each cycle of operation of the machine. That is to say, the cross head will be raised when the cutters 34 and 35 are operating to make the cuts shown in Fig. 4, and will be held raised until after the respective blanks have been subsequently operated upon by the cutters 36 and 37 and delivered to the shaping rolls, which will be described; whereupon the cross head 56 will be permitted to drop and the points 50 and 51 brought below the upper surface of the table 3. The upward movement of the points 50 and 51 take place when they are in the relative lateral positions as shown in Fig. 5, and thereafter they are moved to the left or to the position shown in Fig. 6, thus moving the blank A to the right, and the blank B to the left to place them in position to be operated upon by the cutters 36 and 37. They remain in the position shown in Fig. 6 until after the cutters 36 and 37 have operated; whereupon the points 50 and 51 will be moved still further to the right and left respectively, as shown in Fig. 7, and will deliver the respective blanks to the respective sets of shaping rolls, after which they will drop below the surface of the table 3 and will again be moved to place them in the position shown in Fig. 5. The lateral movement of the carriers 52 and 53 is secured by means of the levers 72 and 73, which are pivotally connected at their upper ends 74 and 75 to blocks 76 (only one of which is shown in the drawing, see Fig. 8), which blocks are arranged to slide in T-shaped vertical grooves 77 and 78 in the blocks 52 and 53 respectively.

The levers 72 and 73 are pivoted at their lower ends to cross pieces 79 and 80 extending between the side frames and are arranged upon opposite sides of the cam cylinder 67 (see dotted lines, Fig. 1). The levers 72 and 73 carry cam rolls 81 and 82 respectively engaging the cam grooves 83 and 84 formed in the cam cylinder 67. These cam grooves 83 and 84 are of suitable shape to impart a rocking movement to the levers 72 and 73 and thus move the carriers 52 and 53 along their guides 57 and 58. The extent of movement of these levers 72 and 73 is indicated by dotted lines in Fig. 2, from which it will be seen that their paths of movement intersect or cross. The cam grooves 83 and 84 also, it will be understood, will be so shaped as to first move the carriers 52 and 53 from the position shown in Fig. 5 to the position shown in Fig. 6, and at this point to dwell while the cutters 36 and 37 are operating upon the blanks, after which the carriers 52 and 53 will be moved to the position shown in Fig. 7 to deliver the respective blanks to the shaping rolls and then the cross head 56 being permitted to drop, the cams 83 and 84 will return the carriers 52 and 53 to the position shown in Fig. 5.

As hereinbefore intimated, after the cutters complete their operation upon the blanks A and B, beveling both edges as shown in Figs. 10 and 11, these blanks are acted upon by shaping rolls 85 and 86 at one side of the machine and 87 and 88 at the other side of the machine. The rolls 85 and 86 are mounted on the shafts 89 and 90 and the rolls 87 and 88 on shafts 91 and 92, which shafts 89 and 90 are mounted in suitable bearings in a frame or bracket 93 and the shafts 91 and 92 are mounted in suitable bearings in a frame or bracket 94. The meeting surfaces of the rolls 85 and 86 and 87 and 88 respectively are on a level with the upper surface of the bed or table 3, whereupon the respective blanks will be moved by the points 50 and 51 laterally towards the left and right respectively to be engaged by the shaping rolls. These rolls are revolved in opposite directions and for this purpose the shafts 90 and 92 respectively carry bevel gears 95 and 96, which mesh with and are driven by the bevel pinions 97 and 98, respectively. At their opposite ends the shafts 90 and 92 respectively carry gears 99 and 100 which mesh with and drive respectively the gears 101 and 102 fastened to the shafts 89 and 91 respectively. Thus the rotation of the shafts 90 and 92 through the bevel pinions 97 and 98 will impart through the meshing gears 99 and 101 and 100 and 102 respectively a reverse rotation to the respective shafts 89 and 91, thus causing the rolls 85 and 86 and 87 and 88 to revolve in reverse directions. The bevel gears 97 and 98 respectively are mounted upon the upper ends of the shafts 103 and 104 respectively, mounted in an inclined direction and to rotate in suitable bearings 105 and 106 respectively. At their lower ends the shafts 103 and 104 are provided with bevel pinions 107 and 108 respectively which mesh with and are driven by bevel gears 109 and 110 respectively, carried by the shaft 17.

The operation of our machine is as follows:—Assuming that the machine has previously acted upon a strip of material as shown in Fig. 4, the strip will have its forward end shaped substantially like one side of the blank to be produced, but the edge will be under cut or provided with an under bevel surface. The strip of material is fed into the machine between the levers 20 and 21 and will be positioned upon the bed 3, by the end guides 46 and the side guides 47. The machine being set in operation, the lever 10 will be rocked, thus causing its cutters 34 and 35 to cut from the strip of material the two blanks substantially as shown in Fig. 4. While the cutters 34 and 35 have been operating and while the blanks are held upon the table 3 by the presser feet 38 and 39, the cross head 56 will be raised while the points 50 and 51 are in position shown in Fig. 5, thus causing the points 50 to engage the under surface of the blank B, and the points 51 to engage the under surface of the blank A. Thereupon the lever 10 will be rocked in the reverse direction, raising the cutters 34 and 35 and the carriers 52 and 53 will be moved towards the right and left respectively, causing the points 50 and 51 to move the blanks A and B to the right and left respectively, as the machine is shown in Fig. 4, to place the respective blanks in position to be acted upon by the cutters 36 and 37. The carriers 52 and 53 will remain at rest temporarily holding the blanks in position to be operated upon by the cutters 36 and 37 and the levers 20 and 21 will be rocked to carry the cutters 36 and 37 downward to operate upon the respective blanks A and B. These cutters, it is understood, will bevel the opposite edges of the blanks to those which have been previously beveled by the cutters 34 and 35. After the knives 36 and 37 have operated, the levers 20 and 21 will be rocked in the reverse direction to raise the knives 36 and 37, and the carriers 52 and 53 will complete their movements to the right and left respectively, forcing the blanks A and B between the shaping rolls 87 and 88 and 85 and 86 respectively. These rolls are constantly rotated and they are, as is well understood, provided with suitable die faces to compress and shape the blanks, thus producing a shape in cross section as illustrated in Fig. 14.

After delivering the blanks to the shaping rolls the carriers 52 and 53 with the cross head 56 will be lowered and the carriers will be again returned to the position shown in Fig. 5. This completes the cycle of operation of the machine.

Having described our invention and its mode of operation, we claim as new and desire to protect by Letters Patent of the United States:—

1. In a machine for making shoe shanks, in combination, a bed or table for supporting the material to be cut, a centrally disposed cutter head carrying two cutters located upon one side of the bed or table, and a pair of cutter heads carrying each a single cutter located upon the opposite side of the bed or table and means to operate the cutter heads in time relation to each other, substantially as described.

2. In a machine for making shoe shanks, in combination, a bed or table to support the material, a centrally disposed cutter head carrying two cutters located upon one side of the bed or table, a pair of cutter heads each carrying a single cutter and located at the opposite side of the bed or table, means to operate the central cutter head to sever from a strip of material two blanks, means to move the blanks laterally along the bed or table in opposite directions to position them to be operated on by the other cutters and means to operate these latter cutters, substantially as described.

3. In a machine for making shoe shanks, in combination, a bed or table to support the material, a cutter head carrying two cutters, means to operate said cutter head to cause its cutters to sever from a strip of material two blanks, means to move the blanks laterally along the table in opposite directions, a pair of cutters mounted upon independent cutter heads and means to operate the latter cutters, substantially as described.

4. In a machine for making shoe shanks, in combination, a bed or table to support the material, a pair of cutters mounted upon a cutter head, means to operate the pair of cutters to cut from the material two blanks, said cutters operating to bevel one edge of each of the blanks, a pair of cutter heads each carrying a single cutter and operating at each side of the first pair of cutters and along the opposite edges of the blanks, substantially as described.

5. In a machine for making shoe shanks, in combination, a bed or table to support the material, a cutter head carrying two cutters mounted upon one side of the bed or table and centrally disposed with relation thereto, a pair of cutter heads each carrying a single cutter mounted at the opposite side of the bed or table and operating at either side of the point of operation of the central cutters and transfer mechanism for transferring the blanks from the point of operation of the central cutters to the point of operation of the respective side cutters, substantially as described.

6. In a machine for making shoe shanks, in combination, a bed or table to support the material, cutters for simultaneously cutting therefrom two blanks, means to move the blanks laterally in opposite directions, a pair of cutters for operating upon the respective blanks and shaping rolls for shaping the blanks, substantially as described.

7. In a machine for making shoe shanks, in combination, a bed or table for supporting the material, a pair of cutters operating simultaneously at the center of the bed or table for cutting from the strip of material two blanks, means to move the blanks laterally in opposite directions to positions at either side of the point of operation of the pair of cutters, a pair of cutters located at the opposite side of the table for operating upon the respective blanks, means to operate the second pair of cutters, and shaping rolls located at opposite ends of the bed or table for shaping the blanks, substantially as described.

8. In a machine for making shoe shanks, in combination, a bed or table, a plurality of cutters mounted adjacent the bed or table and operating at different points along the bed or table and means for engaging the material to be cut and transferring it along the bed or table from the point of operation of one of the cutters to the point of operation of another of the cutters, substantially as described.

9. In a machine for making shoe shanks, in combination, a bed or table to support the material, a plurality of cutters operating in suitable time relation and at different points along the bed or table, shaping rolls located at opposite ends of the table and a transferring mechanism arranged to engage the blanks cut from the material and transfer the blanks in opposite directions along the bed or table to position the blanks beneath the side cutters and deliver the blanks to the shaping rolls, substantially as described.

10. In a machine for making shoe shanks, in combination, a bed or table to support the material, a rocking lever pivoted at one side of the bed or table and at the center thereof and carrying a pair of cutters, a pair of rocking levers located at the opposite side of the table each carrying a single cutter and means for rocking the levers in time relation to each other, substantially as described.

11. In a machine for making shoe shanks, in combination, a bed or table to support the material, a rocking lever mounted at one side of the bed or table and at the center thereof, and carrying a pair of cutters disposed at an angle of substantially 45 degrees with relation to the bed or table, a pair of rocking levers located at the opposite side of the table and each carrying a single cutter supported at an angle of substantially 45 degrees and arranged to operate at either side of the point of operation of the first mentioned cutters, and means to rock the levers to cause their cutters to operate upon the material upon the table, substantially as described.

12. In a machine for making shoe shanks, in combination, a bed or table to support the material to be cut, cutters and their operating mechanism arranged to operate at different points along the bed or table, a suitable transferring mechanism comprising upwardly extending points passing through slots in the bed or table and means to operate the points to engage the under surface of the material supported upon the bed or table and to transfer the blanks cut therefrom along the bed or table, substantially as described.

13. In a machine for making shoe shanks, in combination, a bed or table to support the material to be cut, suitable cutters for cutting therefrom two blanks and beveling one edge of each blank, suitable cutters for operating upon the respective blanks and for beveling the opposite edges of the blanks, and shaping rolls located at opposite ends of the table for shaping the respective blanks, substantially as described.

14. In a machine for making shoe shanks, in combination, a slotted bed or table for supporting the material to be cut, arms carrying points arranged to move in the slots of the table, means to raise the arms vertically and means to move them longitudinally along the bed or table, substantially as described.

15. In a machine for making shoe shanks, in combination, a bed or table to support the material to be cut, said table provided with slots overlapping and parallel to each other at the center of the table and extending in opposite directions towards each end of the table, arms carrying points movable in the respective slots, carriers for the arms, a cross head and suitable guides for the carriers, means to raise and lower the cross head and means to reciprocate the carriers, substantially as described.

In testimony whereof we affix our signature, in presence of two witnesses.

ALLSTON D. GURNEY.
BRADFORD B. WATERMAN.

Witnesses:
T. HART ANDERSON,
MAY A. KENNEY.